(12) United States Patent
Dewa

(10) Patent No.: US 9,986,270 B2
(45) Date of Patent: May 29, 2018

(54) RECEPTION AND TRANSMISSION OF TRIGGER INFORMATION FOR APPLICATION PROGRAM CONTROL

(75) Inventor: Yoshiharu Dewa, Tokyo (JP)

(73) Assignee: Saturn Licensing LLC, New York, NY (US)

(*) Notice: Subject to any disclaimer, the term of this patent is extended or adjusted under 35 U.S.C. 154(b) by 145 days.

(21) Appl. No.: 13/107,604

(22) Filed: May 13, 2011

(65) Prior Publication Data
US 2012/0072965 A1 Mar. 22, 2012

Related U.S. Application Data

(60) Provisional application No. 61/384,888, filed on Sep. 21, 2010.

(51) Int. Cl.
H04N 7/10 (2006.01)
H04N 21/236 (2011.01)
H04N 21/43 (2011.01)
H04N 21/434 (2011.01)
H04N 21/81 (2011.01)
H04N 21/242 (2011.01)
H04N 21/8547 (2011.01)
H04H 20/93 (2008.01)

(52) U.S. Cl.
CPC ...... H04N 21/23614 (2013.01); H04H 20/93 (2013.01); H04N 21/242 (2013.01); H04N 21/4307 (2013.01); H04N 21/4348 (2013.01); H04N 21/8173 (2013.01); H04N 21/8547 (2013.01); H04H 2201/40 (2013.01)

(58) Field of Classification Search
CPC ............ H04N 21/242; H04N 21/4348; H04N 21/8173; H04N 21/23614; H04N 21/4307; H04N 21/8547
USPC ...................... 725/32, 34–36, 112–113, 132
See application file for complete search history.

(56) References Cited

U.S. PATENT DOCUMENTS 6,493,832 B1 12/2002 Itakura et al.
6,570,928 B1 5/2003 Shibata
(Continued)

FOREIGN PATENT DOCUMENTS

EP 2 432 245 A2 3/2012
JP 11-4417 A 1/1999
(Continued)

OTHER PUBLICATIONS

U.S. Appl. No. 13/422,203, filed Mar. 16, 2012, Kitazato, et al.
(Continued)

Primary Examiner — Farzana Hossain
(74) Attorney, Agent, or Firm — Oblon, McClelland, Maier & Neustadt, L.L.P.

(57) ABSTRACT

Disclosed herein is a reception apparatus for receiving AV content, including: a receiver configured to trigger information for controlling processing associated with an application program to be executed in conjugation with a progress of the AV content; a holder configured to hold the application program; and a controller configured to control a state of a first application program depending on whether first trigger information for specifying processing associated with the first application program held in the holder as a subject of control has been received in synchronization with a predetermined reception timing.

17 Claims, 14 Drawing Sheets

(56) References Cited

U.S. PATENT DOCUMENTS

| | | | |
|---|---|---|---|
| 7,028,327 B1 * | 4/2006 | Dougherty | H04N 7/17318 348/E7.071 |
| 7,103,904 B1 * | 9/2006 | Blackketter et al. | 725/32 |
| 2002/0184624 A1 * | 12/2002 | Spencer | H04N 7/163 725/39 |
| 2003/0084453 A1 * | 5/2003 | Laughlin | G06Q 30/02 725/60 |
| 2006/0031914 A1 * | 2/2006 | Dakss et al. | 725/135 |
| 2007/0140650 A1 | 6/2007 | Suzuki | |
| 2008/0010342 A1 | 1/2008 | Gebhardt et al. | |
| 2009/0320064 A1 * | 12/2009 | Soldan et al. | 725/34 |
| 2012/0063508 A1 | 3/2012 | Hattori et al. | |
| 2012/0084825 A1 * | 4/2012 | Sharma | H04N 21/4351 725/109 |
| 2012/0291064 A1 | 11/2012 | Kitazato | |

FOREIGN PATENT DOCUMENTS

| | | |
|---|---|---|
| JP | 2000-201280 | 7/2000 |
| JP | 2001-313921 A | 11/2001 |
| JP | 2006-050237 | 2/2006 |
| JP | 2006-135614 A | 5/2006 |
| JP | 2006-311120 | 11/2006 |
| JP | 2006-311390 A | 11/2006 |
| JP | 2010-166335 | 7/2010 |
| JP | 2010-183446 | 8/2010 |
| JP | 2012-248908 A | 12/2012 |
| WO | WO 2011/074218 A2 | 6/2011 |

OTHER PUBLICATIONS

U.S. Appl. No. 13/452,376, filed Apr. 20, 2012, Kitahara, et al.
U.S. Appl. No. 13/239,871, filed Sep. 22, 2011, Kitazato.
U.S. Appl. No. 13/238,277, filed Sep. 21, 2011, Kitazato.
U.S. Appl. No. 13/238,080, filed Sep. 21, 2011, Kitazato, et al.
U.S. Appl. No. 13/238,138, filed Sep. 21, 2011, Kitazato.
U.S. Appl. No. 13/238,065, filed Sep. 21, 2011, Kitazato.
U.S. Appl. No. 13/238,264, filed Sep. 21, 2011, Kitazato.
U.S. Appl. No. 13/220,231, filed Aug. 29, 2011, Kitahara, et al.
International Search Report dated Oct. 18, 2011, in PCT/JP2011/070801 (with English-language translation).
U.S. Appl. No. 12/980,917, filed Dec. 29, 2010, Dewa.
U.S. Appl. No. 13/075,440, filed Mar. 30, 2011, Yamagishi, et al.
U.S. Appl. No. 13/071,238, filed Mar. 24, 2011, Yamagishi.
U.S. Appl. No. 13/071,559, filed Mar. 25, 2011, Yamagishi, et al.
U.S. Appl. No. 13/071,560, filed Mar. 25, 2011, Yamagishi.
U.S. Appl. No. 13/071,551, filed Mar. 25, 2011, Kitazato, et al.
U.S. Appl. No. 13/081,566, filed Apr. 7, 2011, Kitazato, et al.
U.S. Appl. No. 13/080,866, filed Apr. 6, 2011, Kitazato, et al.
Extended European Search Report dated Jun. 27, 2014 in Patent Application No. 11826762.4.
Jerry C. Whitaker, et al., "Advanced television systems committee standards work update", SMPTE—Motion Imaging Journal, vol. 118, No. 6, XP001559240, Sep. 1, 2009, pp. 33-37.
Office Action dated Aug. 30, 2016 in Japanese Patent Application No. 2015-186602.
Japanese Office Action dated Feb. 28, 2017 in Japanese Patent Application No. 2015-186602 (with English translation).

* cited by examiner

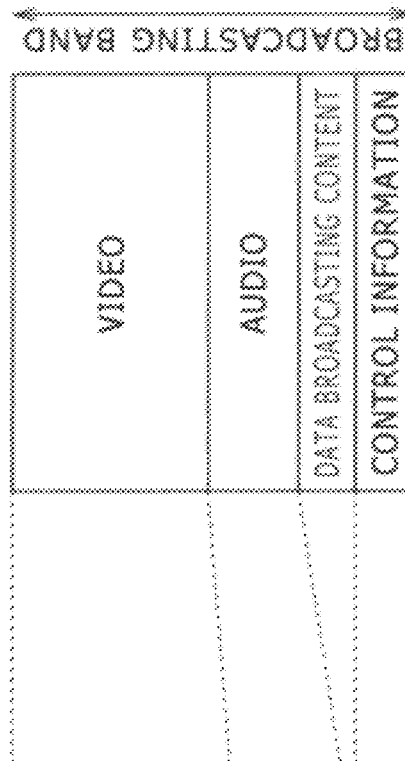
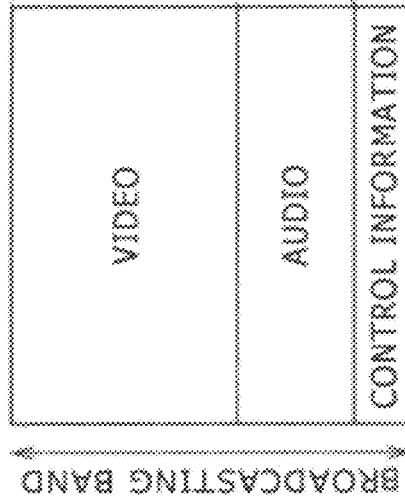

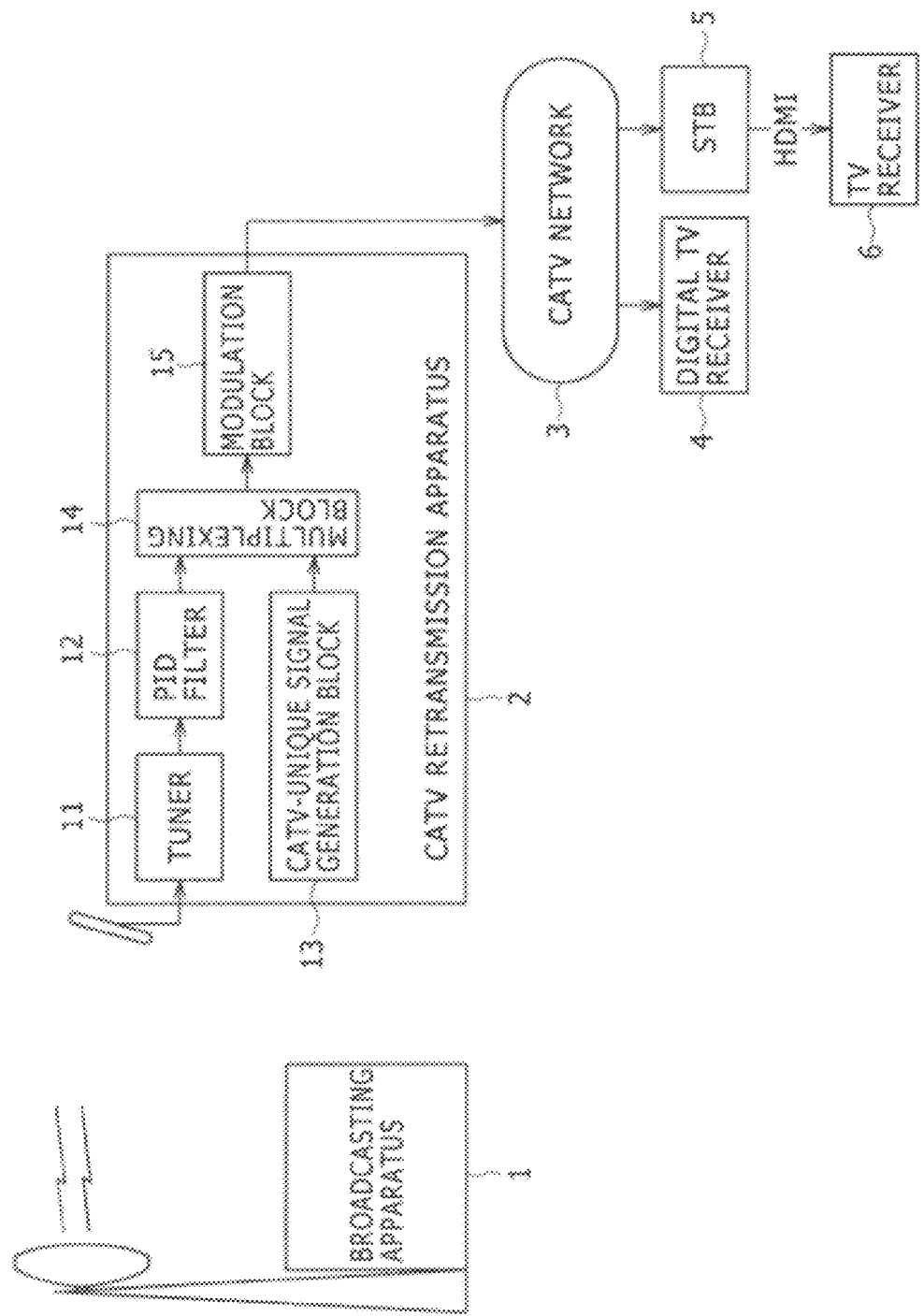

F I G . 7

| ITEMS | DESCRIPTIONS |
|---|---|
| TRIGGER ID | INFORMATION FOR IDENTIFYING TRIGGER INFORMATION |
| TRIGGER TYPE | FOUR TYPES; APPLICATION LAUNCH, APPLICATION TERMINATION, APPLICATION EVENT, AND PRE-CACHE |
| APPLICATION ID | INFORMATION FOR IDENTIFYING APPLICATION |
| APPLICATION TYPE | INFORMATION INDICATIVE OF TYPE (HTML, JAVA, ETC.) OF APPLICATION |
| APPLICATION URL | URL OF SERVER FROM WHICH APPLICATION IS ACQUIRED WHEN TRIGGER TYPE IS APPLICATION LAUNCH OR PRE-CACHE |
| STORED APPLICATION ID | INFORMATION FOR IDENTIFYING DOWNLOADED APPLICATION TO BE LAUNCHED WHEN TRIGGER TYPE IS APPLICATION LAUNCH |
| AUTO START FLAG | INFORMATION INDICATIVE OF AUTO START OR MANUAL START WHEN TRIGGER TYPE IS APPLICATION LAUNCH |
| NAME OF APPLICATION | NAME OF APPLICATION TO BE PRESENTED TO USER |
| EVENT ID | INFORMATION FOR IDENTIFYING EVENT WHEN TRIGGER TYPE IS APPLICATION EVENT |

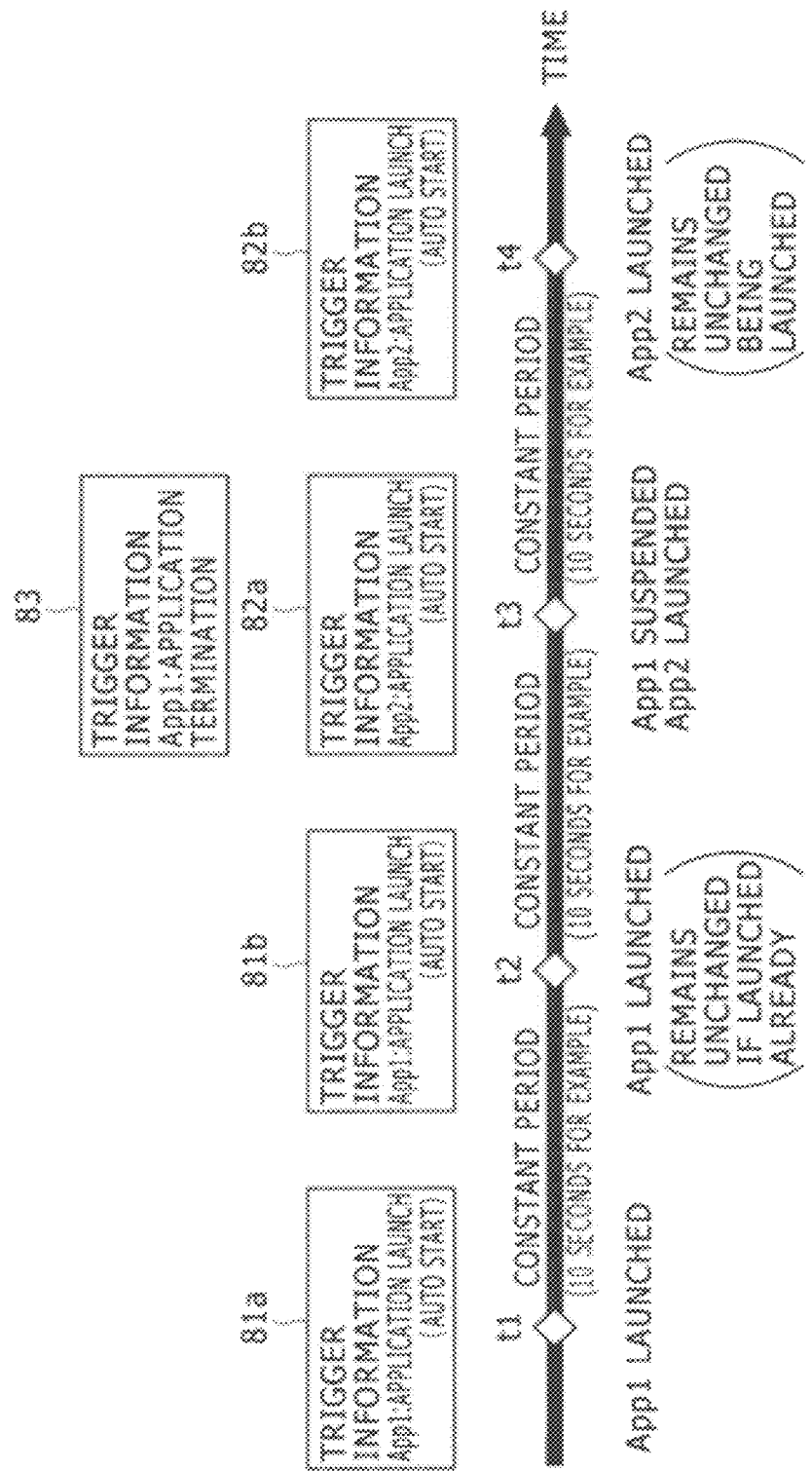

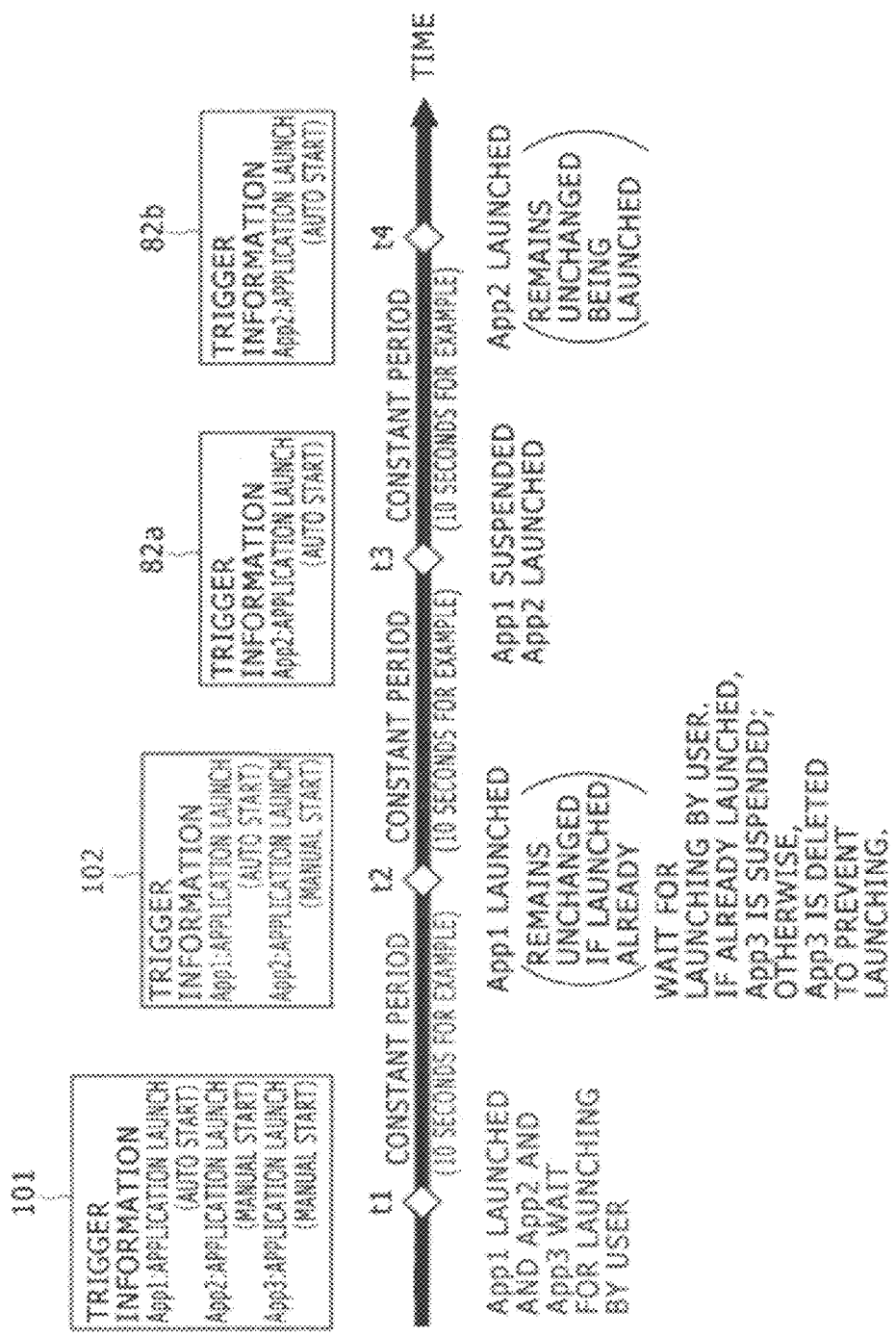

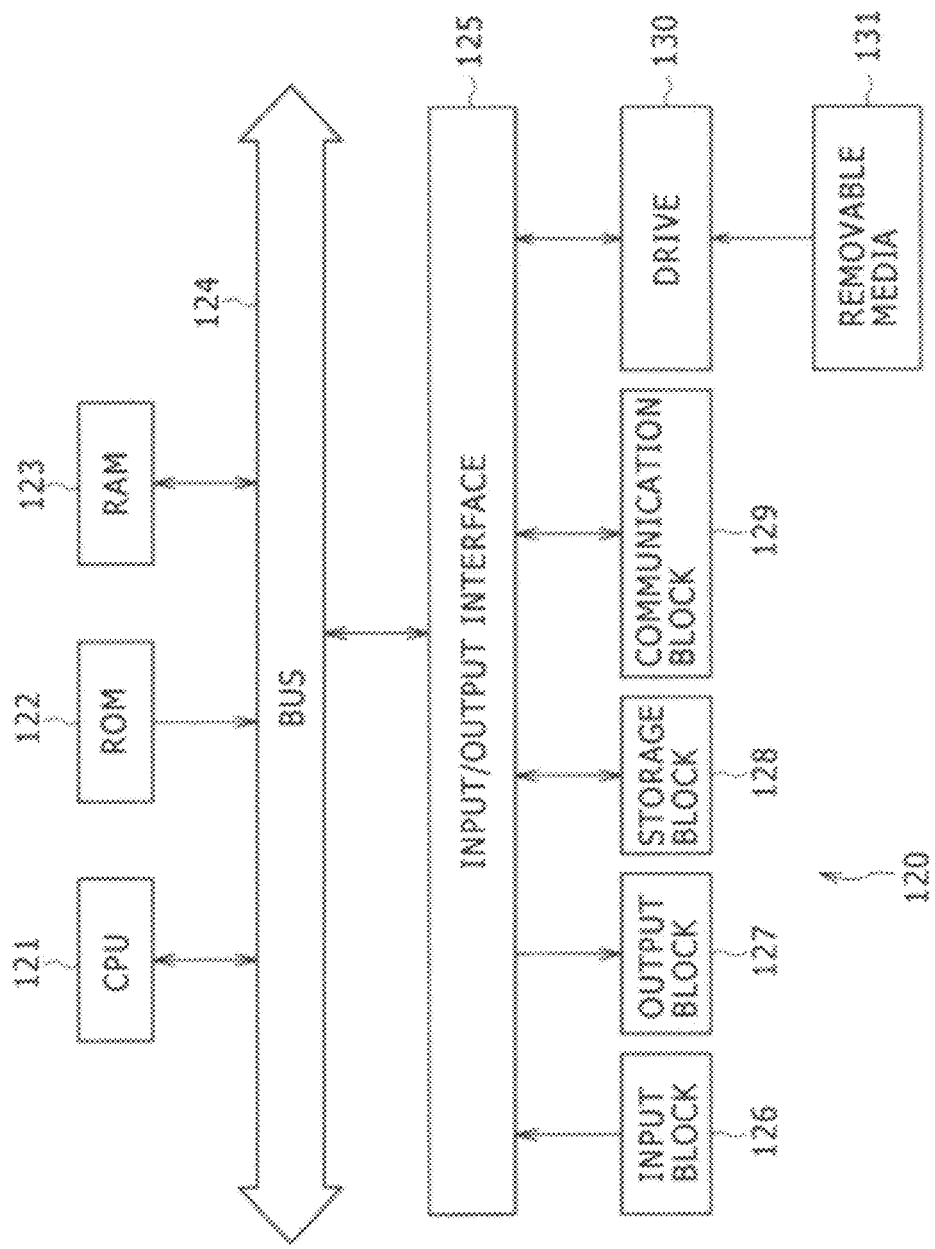

US 9,986,270 B2

RECEPTION AND TRANSMISSION OF TRIGGER INFORMATION FOR APPLICATION PROGRAM CONTROL

CROSS-REFERENCE TO RELATED APPLICATIONS

This invention claims the benefit of U.S. Provisional Application No. 61/384,888, filed Sep. 21, 2010, the entire contents of which is incorporated herein by reference.

BACKGROUND OF THE INVENTION

1. Field of the Invention

The present invention relates to a reception apparatus, a reception method, a transmission apparatus, a transmission method, a program, and a broadcasting system and, more particularly, to a reception apparatus, a reception method, a transmission apparatus, a transmission method, a program, and a broadcasting system that are configured for suitable use in executing and ending data broadcast content in conjugation with the progress of so-called AV (Audio/Video) content equivalent to programs.

2. Description of the Related Art

These days, the digitalization of television broadcasting has been promoted in Japan, resulting in the popularization of terrestrial digital broadcasting and BS (Broadcasting Satellite) digital broadcasting, for example. With digital television broadcasting, such as terrestrial digital broadcasting, not only the broadcasting of so-called AV content equivalent to programs, but also so-called data broadcasting is realized. The content carried by this data broadcasting allows the displaying of the information associated with on-air programs (or AV content) and the information (announcement of other programs, news, weather forecast, traffic information, and so on) not associated with on-air programs as well as the execution of an application that runs in conjugation with an on-air program (or AV content) (refer to Japanese Patent Laid-open No. 2006-50237 for example).

It should be noted that, in the data broadcasting in Japan, a band dedicated to data broadcasting was allocated in advance within the broadcasting band for digital television broadcasting at the time television broadcasting was digitalized. The data broadcasting of Japan was realized by broadcasting data broadcast content by use of this band.

Meanwhile, the digital television broadcasting in the USA has not realized any broadcasting system equivalent to the data broadcasting in the Japanese digital television broadcasting. To be more specific, a broadcasting band for the current digital television broadcasting in the USA is occupied by a video band, an audio band, and a control information band, so that no band is allocated to data broadcast content as shown in FIG. 1A. Therefore, the allocation of the band for broadcasting the content for data broadcasting to the limited broadcasting band for digital television broadcasting must narrow the video band and the audio band as shown in FIG. 1B, for example.

SUMMARY OF THE INVENTION

However, the narrowing of the video band and the audio band to allocate a band for broadcasting the content for data broadcasting does not lead to a realistic solution because of the inevitable deterioration in the picture and tone qualities of television programs.

Further, because digital television program retransmission systems based on CATV (Cable TV) networks are wide spread in the USA, the following problems are encountered.

Referring to FIG. 2, there is shown an exemplary configuration of a digital television program retransmission system based on a CATV network.

This retransmission system is mainly made up of a broadcasting apparatus 1, a CATV retransmission apparatus 2, a digital television receiver 4, a STB (Set Top Box) 5, and a television receiver 6.

The broadcasting apparatus 1 installed in a broadcasting station for example broadcasts digital television broadcasting signal by use of the terrestrial wave or the satellite wave. The CATV retransmission apparatus 2 installed in a cable TV station for example receives a digital television broadcast from the broadcasting apparatus 1, removes unnecessary information from the received broadcast, adds CATV-unique information to the received broadcast, and retransmits the processed broadcast to the digital television receiver 4 and the set top box 5 via a CATV network 3.

The CATV retransmission apparatus 2 is made up of a tuner 11, a PID (Packet Identifier) filter 12 for filtering a packet having a predetermined packet ID, a CATV-unique signal generation block 13, a multiplexing block 14, and a modulation block 15.

The tuner 11 receives a digital television broadcast signal of each channel and demodulates the received signal, outputting a resultant TS (Transport Stream) to the PID filter 12. The PID filter 12 removes packets (not associated with AV (Audio/Video) content as a program) corresponding to a predetermined packet ID from the TS and outputs the resultant TS to the multiplexing block 14. The CATV-unique signal generation block 13 generates a packet in which information unique to this CATV station is stored and outputs the generated packet to the multiplexing block 14. The multiplexing block 14 multiplexes the output of the PID filter 12 and the output of the CATV-unique signal generation block 13 and outputs a resultant signal to the modulation block 15. The modulation block 15 modulates the output of the multiplexing block 14 by a demodulating scheme suited to the CATV network 3 and retransmits the modulated signal to the digital television receiver 4 and the set top box 5 via the CATV network 3.

The digital television receiver 4 compliant with CATV receives the TS of the digital television broadcast retransmitted via the CATV network 3 and decodes the received TS, thereby displaying a resultant video signal and outputting a resultant audio signal.

The set top box 5 compliant with CATV receives the TS of the digital television broadcast retransmitted via the CATV network 3 and decodes the received TS, thereby outputting a resultant video signal and an audio signal to the television receiver 6 via an HDMI cable for example. On the basis of the video signal and the audio signal entered from the set top box 5 via the HDMI cable for example, the television receiver 6 displays the video signal and outputs the audio signal.

As described above, in the CATV retransmission apparatus 2, a packet (not associated with AV content as a program) corresponding to a predetermined packet ID is removed from the TS of each digital broadcasting signal by the PID filter 12. For this reason, if a band for broadcasting content for data broadcasting is allocated to the broadcasting band as shown in FIG. 1B, packets stored in the content for data broadcasting may be excluded by this PID filter 12.

Therefore, the present invention addresses the above-identified and other problems associated with related-art methods and apparatuses and solves the addressed problems by providing a reception apparatus, a reception method, a transmission apparatus, a transmission method, a program, and a broadcasting system that are configured to realize the content for data broadcasting that can be executed and ended in conjugation with the progress of a television broadcast program and a CM without providing a band for data broadcasting in the broadcasting band of digital television broadcasting.

A reception apparatus for receiving AV content according to a first embodiment of the present invention, including: reception means for receiving trigger information for controlling processing associated with an application program to be executed in conjugation with a progress of the AV content; holding means for holding the application program; and control means for controlling a state of a first application program depending on whether first trigger information for specifying processing associated with the first application program held in the holding means as a subject of control has been received in synchronization with a predetermined reception timing.

In the above-mentioned reception apparatus, the control means deletes the first application program from the holding means when the first trigger information has transitioned from a state in which the first trigger information is received in synchronization with the reception timing to a state in which the first trigger information is not received in synchronization with the reception timing.

In the above-mentioned reception apparatus, the control means terminates the active first application program and deletes the terminated first application program from the holding means when the first trigger information has transitioned from a state in which the first trigger information is received in synchronization with the reception timing to a state in which the first trigger information is not received in synchronization with the reception timing.

In the above-mentioned reception apparatus, the control means controls a state of the first application program depending on whether the first trigger information is received within a reception period of time based on the reception timing in synchronization with the reception timing.

In the above-mentioned reception apparatus, if the first trigger information is received in synchronization with the reception timing, the control means, if the same first trigger information as the first trigger information received in synchronization with the reception timing of the last time has been received, controls one of operations that the active state of the active first application program is maintained and the holding state of the first application program held in the holding means is maintained. If the first trigger information including a trigger type different from a trigger type included in the first trigger information received in synchronization with the reception timing of the last time is received, the control means controls one of operations on the basis of the trigger type included in the received the first trigger information that the first application program is launched, an event in the active first application program is fired, and the active first application program is terminated.

In the above-mentioned reception apparatus, if the first application program is not held in the holding means, the control means holds the first application program in the holding means on the basis of a trigger type included in the first trigger information when the first trigger information is received.

A reception method for a reception apparatus for receiving AV content according to the first embodiment of the present invention, including the steps of: receiving, by the reception apparatus, trigger information for controlling processing associated with an application program to be executed in conjugation with a progress of the AV content; holding, by the reception apparatus, the application program; and controlling, by the reception apparatus, a state of a first application program depending on whether first trigger information for specifying processing associated with the first application program held in the holding step as a subject of control has been received in synchronization with a predetermined reception timing.

A program for controlling a reception apparatus for receiving AV content according to the first embodiment of the present invention, the program causing a computer of the reception apparatus to execute processing including the steps of: receiving trigger information for controlling processing associated with an application program to be executed in conjugation with a progress of the AV content; holding the application program; and controlling a state of a first application program depending on whether first trigger information for specifying processing associated with the first application program held in the holding step as a subject of control has been received in synchronization with a predetermined reception timing.

According to the first embodiment of the invention, the trigger information for controlling the processing associated with an application program to be executed in conjugation with the progress of the above-mentioned AV content is received. The state of the above-mentioned first application program is controlled depending on whether the first trigger information for specifying, as a subject of control, the processing associated with the first application program held in the holding means for holding the above-mentioned application program has been received in synchronization with a predetermined reception timing.

A transmission apparatus for transmitting AV content according to a second embodiment of the present invention, including: transmission means for transmitting trigger information for controlling processing associated with an application program to be executed on a reception apparatus in conjugation with a progress of the AV content, the transmission being executed in synchronization with a transmission timing corresponding to a reception timing predetermined by the reception apparatus.

In the above-mentioned transmission apparatus, the transmission means transmits the trigger information in synchronization with the transmission timing with which the trigger information is received by the reception apparatus within a reception period of time based on the reception timing.

In the above-mentioned transmission apparatus, the transmission means transmits a plurality of the trigger information in synchronization with the transmission timing with which at least one of the plurality of the trigger information is received by the reception apparatus within the reception period of time.

A transmission method for a transmission apparatus for transmitting AV content according to the second embodiment of the present invention, including the step of: transmitting trigger information for controlling processing associated with an application program to be executed on a reception apparatus in conjugation with a progress of the AV content, the transmission being executed in synchronization with a transmission timing corresponding to a reception timing predetermined by the reception apparatus.

A program for controlling a transmission apparatus for transmitting AV content according to the second embodiment of the present invention, the program causing a computer of the transmission apparatus to execute processing including the step of: transmitting trigger information for controlling processing associated with an application program to be executed on a reception apparatus in conjugation with a progress of the AV content, the transmission being executed in synchronization with a transmission timing corresponding to a reception timing predetermined by the reception apparatus.

According to the second embodiment of the invention, trigger information for controlling processing associated with an application program to be executed on a reception apparatus in conjugation with a progress of the AV content is transmitted in synchronization with a transmission timing corresponding to a reception timing predetermined by the reception apparatus.

A broadcasting system according to a third embodiment of the present invention including: a transmission apparatus for transmitting AV content, and a reception apparatus for receiving the transmitted AV content. In this broadcasting system, the transmission apparatus has transmission means for transmitting trigger information for controlling processing associated with an application program to be executed on a reception apparatus in conjugation with a progress of the AV content, the transmission being executed in synchronization with a transmission timing corresponding to a reception timing predetermined by the reception apparatus. The reception apparatus has reception means for receiving trigger information for controlling processing associated with an application program to be executed in conjugation with a progress of the AV content, holding means for holding the application program, and control means for controlling a state of a first application program depending on whether first trigger information for specifying processing associated with the first application program held in the holding means as a subject of control has been received in synchronization with a predetermined reception timing.

According to the third embodiment of the invention, the trigger information for controlling processing associated with the application program to be executed on the reception apparatus in conjugation with the progress of the AV content is transmitted in the transmission apparatus in synchronization with the transmission timing corresponding to the reception timing predetermined by the reception apparatus. The trigger information for controlling processing associated with the application program to be executed in conjugation with the progress of the AV content is received, the application program is held by the holding means, and the state of the first application program is controlled depending on whether first trigger information for specifying processing associated with the first application program held in the holding means as the subject of control has been received in synchronization with a predetermined reception timing in the reception apparatus.

According to the first embodiment of the present invention, the application programs may be launched and the events may be fired or terminated in conjugation with a progress of the AV content such as television programs.

According to the second embodiment of the present invention, launching of the application programs or firing or termination of the events may be controlled in conjugation with a progress of the AV content such as television programs without providing a band for data broadcasting in the broadcasting band for digital television broadcasting.

According to the third embodiment of the present invention, the application programs may be controlled in conjugation with a progress of the AV content such as television programs without providing a band for data broadcasting in the broadcasting band for digital television broadcasting.

BRIEF DESCRIPTION OF THE DRAWINGS

Other features of the invention will become apparent from the following description of embodiments with reference to the accompanying drawings in which:

FIGS. 1A and 1B are diagrams illustrating a broadcasting band for digital television broadcasting;

FIG. 2 is a schematic block diagram illustrating an exemplary configuration of a related-art CATV retransmission system;

FIG. 7 is a diagram illustrating an example of items included in the trigger information;

FIG. 8 is a diagram illustrating an example of the trigger information that is transmitted and received in a predetermined period;

FIG. 13 is a diagram illustrating a still another example of the trigger information that is transmitted and received in a predetermined period; and FIG. 14 is a block diagram illustrating an exemplary configuration of a computer.

DETAILED DESCRIPTION OF THE PREFERRED EMBODIMENTS

This invention will be described in further detail by way of embodiments thereof with reference to the accompanying drawings.

[Exemplary Configuration of a Broadcasting System]

Figure 3:
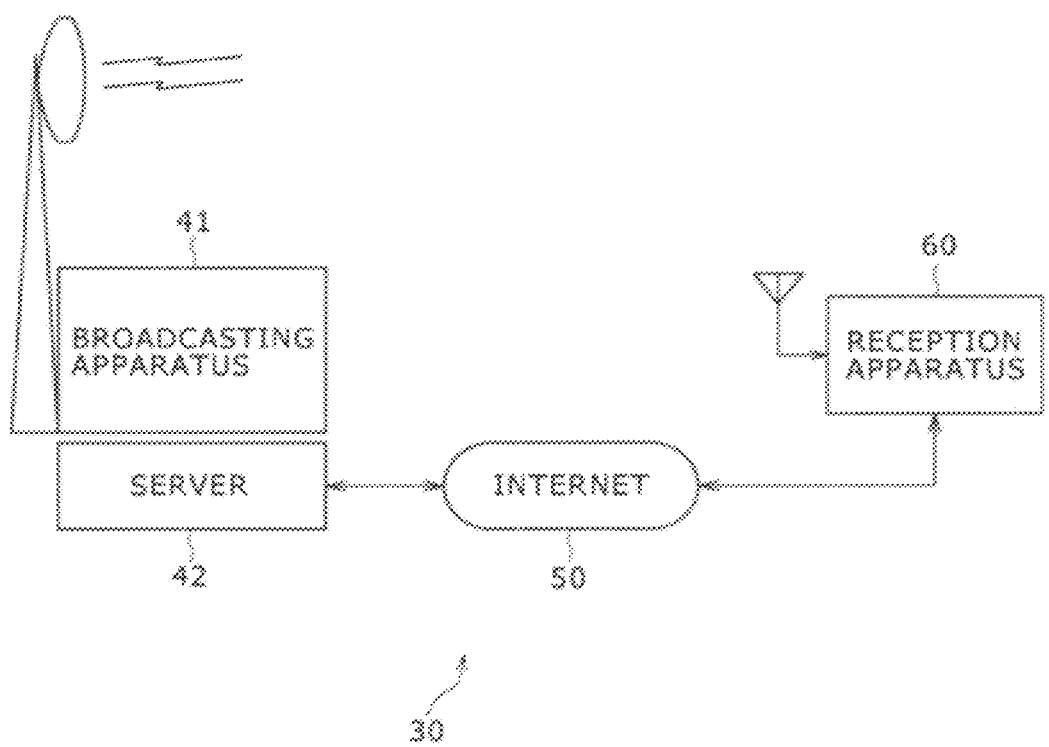
FIG. 3 is a schematic block diagram illustrating an exemplary configuration of a broadcasting system practiced as one embodiment of the present invention.

Now, referring to FIG. 3, there is shown a broadcasting system practiced as one embodiment of the present invention. This broadcasting system 30 is configured to realize the service of content for data broadcasting capable of linking with AV content of a program without providing band for broadcasting the content for data broadcasting in the broadcasting band for digital television broadcasting as with the current state in USA for example.

This broadcasting system 30 is made up of a broadcasting apparatus 41 and a server 42 arranged on the side of a broadcasting station and a reception apparatus 60 arranged on the receiver side.

The broadcasting apparatus 41 is configured to transmit digital television broadcast signals. The broadcasting band of each digital television broadcast signal is occupied by a band for video, a band for audio, and a band for control information as shown in FIG. 1A; therefore no band for broadcasting data broadcasting content is arranged.

In addition, the broadcasting apparatus 41 stores trigger information in a packet (hereafter referred to as a PCR packet) including PCR (Program Clock Reference) of TS packets making up the TS of digital broadcasting signals and transmits the trigger information in synchronization with a predetermined transmission timing (generated at an interval of ten seconds for example).

The trigger information herein denotes information indicative of an executing timing of data broadcasting content, information indicative of data broadcasting content acquisition source, and so on. Details of the trigger information will be described later with reference to FIG. 5 through FIG. 7.

The server 42 supplies data broadcasting content or the like in response to a request from the reception apparatus 60 that has accessed the server 42 via the Internet 50.

The reception apparatus 60 receives a digital broadcasting signal broadcast from the broadcasting apparatus 41, obtains the video and audio of AV content equivalent to a television program and outputs them to a display monitor, not shown. In addition, the reception apparatus 60 accesses the server 42 via the Internet 50 to obtain a data broadcasting content.

Furthermore, the reception apparatus 60 receives the trigger information stored in the PCR packet from the broadcasting apparatus 41 in synchronization with a predetermined reception timing (generated at an interval of ten seconds for example) corresponding to the transmission timing by the broadcasting apparatus 41. It is to be noted that the transmission timing by the broadcasting apparatus 41 is decided depending on the reception timing by the reception apparatus 60 such that the trigger information is received with the timing by the reception apparatus 60. The processing executed by the reception apparatus 60 on the basis of the received trigger information is described in detail with reference to FIGS. 8 to 10.

It should be noted that this reception apparatus 60 may be arranged as a standalone unit or as incorporated in a television receiver or a video recorder, for example.

[Exemplary Configuration of the Reception Apparatus]

Figure 4:
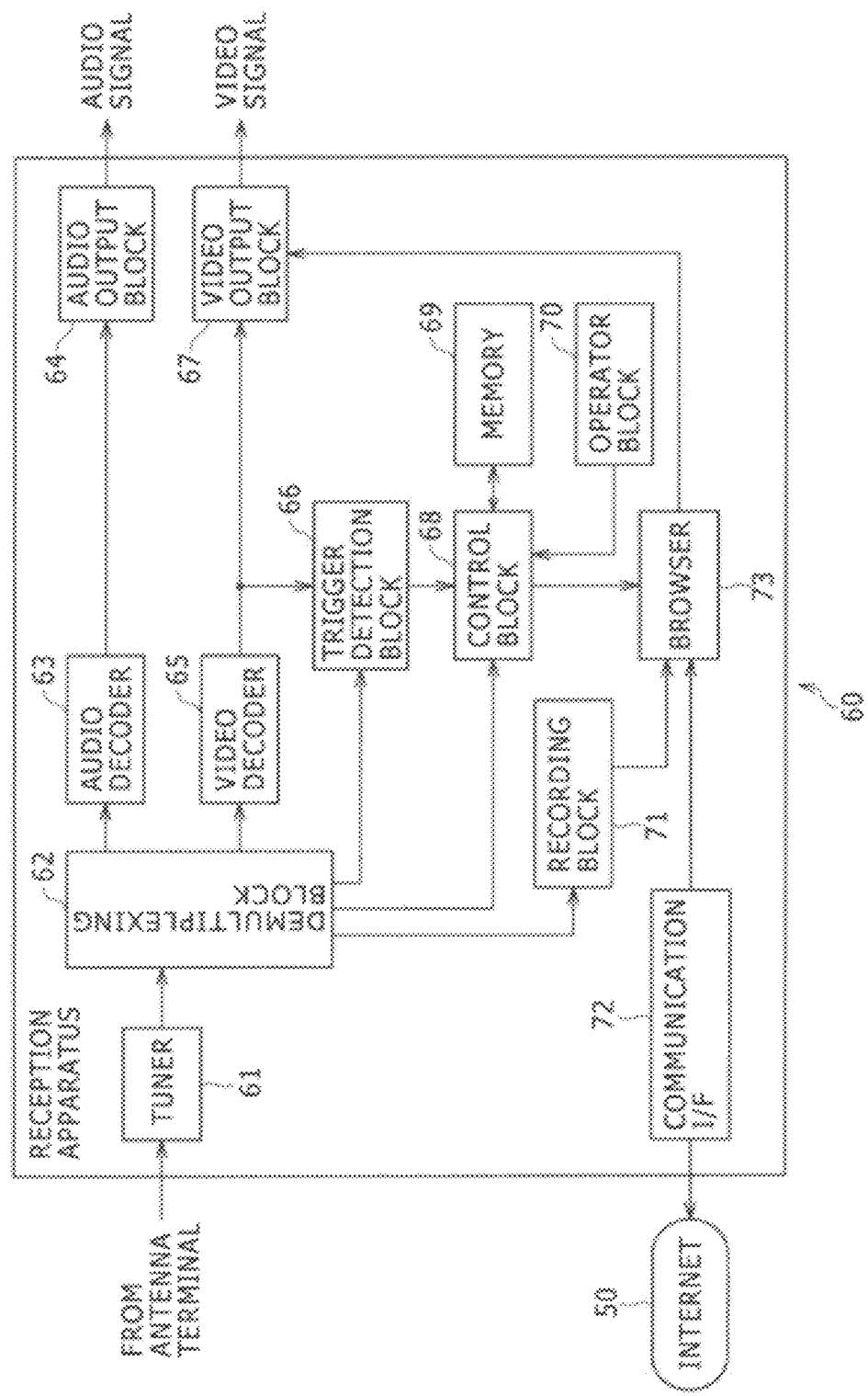
FIG. 4 is a block diagram illustrating an exemplary configuration of a reception apparatus practiced as another embodiment of the present invention.

Referring to FIG. 4, there is shown an exemplary configuration of the reception apparatus 60. The reception apparatus 60 is made up of a tuner 61, a demultiplexer 62, an audio decoder 63, an audio output block 64, a video decoder 65, a trigger detection block 66, a video output block 67, a control block 68, a memory 69, an operator block 70, a recording block 71, a communication I/F 72, and a browser 73.

The tuner 61 receives a digital television broadcasting signal corresponding to a channel selected by a user, demodulates the received signal, and outputs a resultant TS to the demultiplexer 62. The demultiplexer 62 separates the TS supplied from the tuner 61 into an audio encoded signal, a video encoded signal, and a control signal and supplies these signals to the audio decoder 63, the video decoder 65, and the control block 68, respectively.

In addition, the demultiplexer 62 extracts a PCR (Program Clock Reference) packet that includes the trigger information arranged in the TS and outputs the extracted PCR packet to the control block 68.

The audio decoder 63 decodes the entered audio encoded signal and outputs a resultant audio signal to the audio output block 64. The audio output block 64 outputs the entered audio signal to a subsequent stage (a monitor for example).

The video decoder 65 decodes the entered video encoded signal and outputs a resultant video signal to the trigger detection block 66 and the video output block 67.

It should be noted that, in the present embodiment, the broadcasting apparatus 41 is explained such that trigger information is transmitted as stored in the PCR packet of a TS; however, it is also practicable to transmit trigger information as embedded in a video signal.

In this case, the trigger detection block 66 monitors the entered video signal to detect trigger information embedded in the video signal.

The video output block 67 outputs a video signal entered from the video decoder 65 to the subsequent stage (a display monitor for example). Also, the video output block 67 combines content for data broadcasting entered from the browser 73 and a video signal entered from the video decoder 65, outputting the combined signal to the subsequent stage. It should be noted that the outputs from the audio output block 64 and the video output block 67 to the subsequent can be implemented by use of an HDMI (High Definition Multimedia Interface) cable for example.

The control block 68 executes a control program stored in the memory 69 to control the reception apparatus 60 in its entirety. Also, on the basis of the trigger information entered from the demultiplexer 62 (or the trigger detection block 66), the control block 68 controls the acquisition, launching, event firing, and termination of an application program for implementing the data broadcasting content linked with a television program.

The memory 69 stores the control program that is executed by the control block 68. This control program can be updated on the basis of the update data that is obtained from a digital television broadcasting signal or via the Internet 50. The operator block 70 receives operations done by the user and supplies the operation signals corresponding to the operations to the control block 68.

If the data broadcasting application is distributed by use of a digital television broadcast signal, the recording block 71 holds the downloaded data broadcasting application in a recording media incorporated in the recording block 71.

The communication I/F 72 connects the reception apparatus 60 to the server 42 via the Internet 50 under the control of the browser 73. Under the control of the control block 68, the browser 73 obtains a data broadcasting application program (hereinafter also simply referred to as data broadcasting application) from the server 42 via the communication I/F 72 and the Internet 50.

[Details of Trigger Information]

Figure 5:
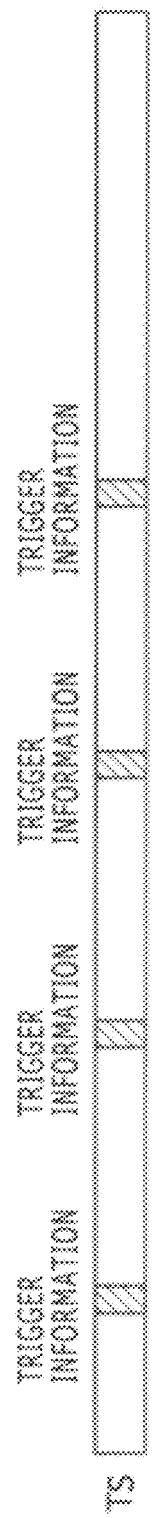
FIG. 5 is a diagram illustrating a concept of transmitting trigger information as stored in a PCR packet of a TS.

Referring to FIG. 5, there is shown a concept in which trigger information is stored in the PCR packet of a TS and is transmitted in synchronization with a predetermined transmission timing (generated at an interval of ten seconds for example). As shown in FIG. 5, trigger information is not stored in all PCR packets but stored in a PCR packet to as to be transmitted in synchronization with a transmission timing. Each PCR packet normally passes the PID filter 12 of the CATV retransmission apparatus 2 as shown in FIG. 2, so that a reception apparatus (the digital television receiver 4 shown in FIG. 2) using a CATV network can be notified of trigger information.

Figure 6:
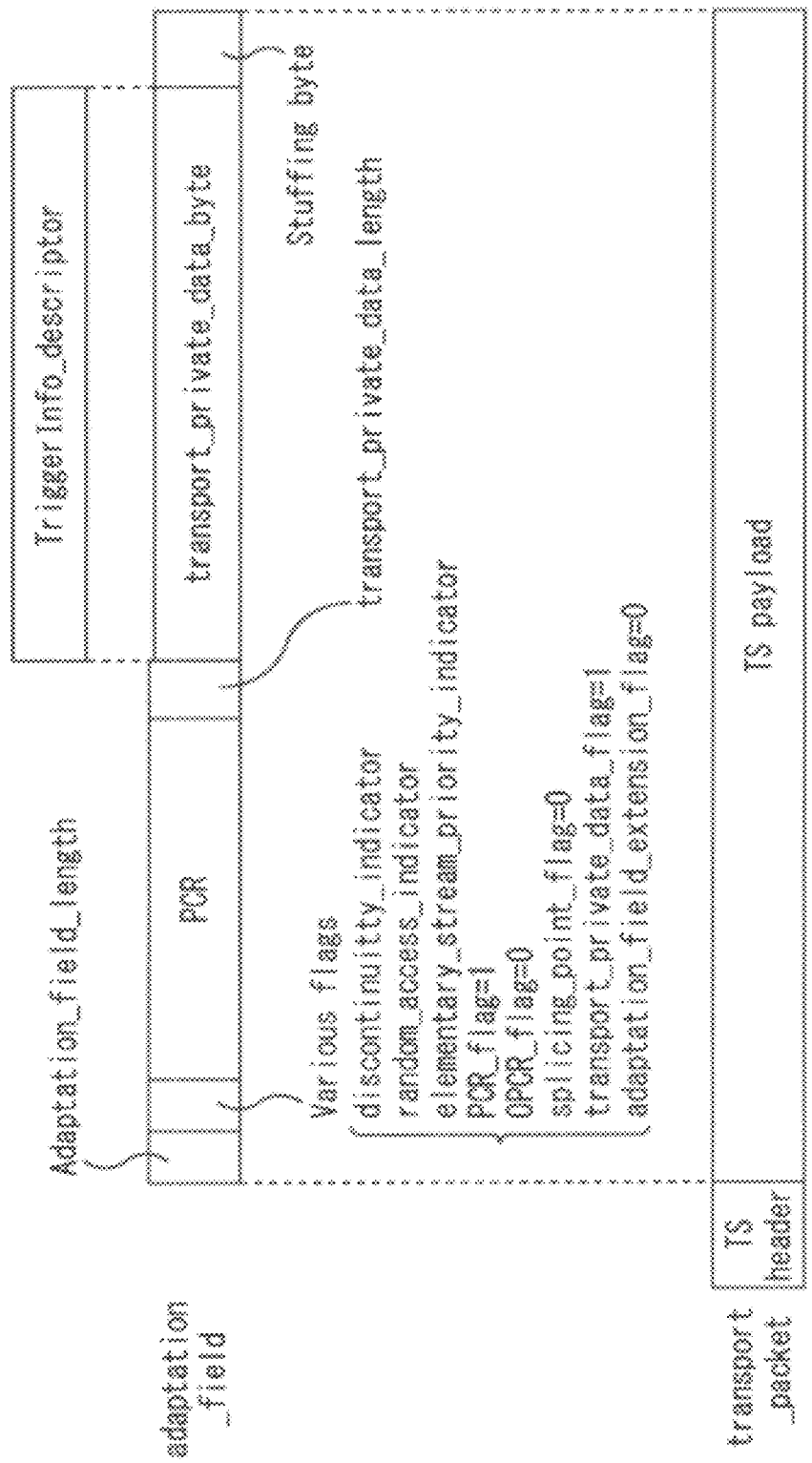
FIG. 6 is a diagram illustrating a specific arrangement of a trigger information in the PCR packet.

FIG. 6 shows position where the trigger information is stored in a PCR packet. With a PCR packet, PCR is stored in adaptation_field of a TS packet, in which trigger information (Trigger_Info_descriptor) is stored in transport_private_data_byte subsequent to PCR. It should be noted that, if trigger information is stored, transport_private_data_flag of Various_flags arranged in front of PCR is set to "1."

Referring to FIG. 7, there is shown one example of items of information included in trigger information.

Trigger ID is information for identifying this trigger information. It should be noted that, if trigger information having the same contents is transmitted two or more times, the trigger ID of each trigger information is identical to each other. Trigger type is indicative that this trigger information is application launch (specifying the acquisition and launching of a data broadcasting application), application termination (specifying the termination of an active data broadcasting application), application event (specifying the firing of an event (updating of display contents, for example) in an active data broadcasting application), or pre-cache (indicating only the acquisition of a data broadcasting application). It is also practicable to add other commands to the above-mentioned commands.

Application ID is information for identifying a data broadcasting application corresponding to this trigger information. Application type is information indicative of the type (html, java, and so on) of a data broadcasting application corresponding to this trigger information. Application URL (Uniform Resource Locator) is a URL of the acquisition source (the server 42 in this example) of a data broadcasting application if the trigger type is application launch or pre-cache. Stored application ID is written only when an already stored (or already acquired) data broadcasting application to be launched is specified without instantly obtaining a data broadcasting application if the trigger type is application launch.

Auto start flag is written when the trigger type is application launch is set on or off state. When this auto start flag is on, auto start is provided (namely, the data broadcasting application is automatically started). When this auto start flag is off, manual start is provided (namely, the user is prompted to do an input operation and the data broadcasting application is started in response).

Name of application is indicative of the name of a data broadcasting application to be presented to the user if the auto start flag is manual start. Event ID is information for identifying, if the trigger type is an application event, that event. It should be noted that the trigger information does not include all of the above-described items but only the items that are necessary at a certain time.

The following describes one example of processing to be executed on the basis of the trigger information received by the reception apparatus 60 from the broadcasting apparatus 41 in synchronization with a predetermined reception timing.

It should be noted that, in FIG. 8, the reception apparatus 60 receives trigger information transmitted from the broadcasting apparatus 41 in synchronization with transmission timing tn' (n=1, 2, 3, 4, . . . ), in synchronization with reception timing tn corresponding to transmission timing tn'.

Here, let arrival time in which trigger information is transmitted in synchronization with transmission timing tn' from the broadcasting apparatus 41 and the transmitted trigger information is received by the reception apparatus 60 in synchronization with reception timing tn be "a," then reception timing tn is a timing at which arrival time a has passed from transmission timing tn'.

Also, in FIG. 8, transmission timing tn' and reception timing tn are described to occur at predetermined periods (every ten seconds for example), respectively.

It should be noted that transmission timing tn' and reception timing tn are not restricted to predetermined periods; these timings may be set to any other timings. To be more specific, for example, in reception timing tn, reception timing t2 may occur five seconds after reception timing t1, reception timing t3 occurs seven seconds after reception timing t2, and reception timing t4 occurs nine seconds after reception timing t3. This holds the same with transmission timing tn'.

In FIG. 8, trigger information 81a is transmitted from the broadcasting apparatus 41 in synchronization with transmission timing t1' and received by the reception apparatus 60 in synchronization with reception timing t1. Trigger information 81a includes at least application ID for identifying a data broadcasting application App1, the trigger type indicative of application launch, and an auto start flag indicative of auto start, in addition to trigger ID.

Trigger information 81b, identical to trigger information 81a in contents, is transmitted from the broadcasting apparatus 41 in synchronization with transmission timing t2' and received by the reception apparatus 60 in synchronization with reception timing t2.

In FIG. 8, trigger information 82a is transmitted from the broadcasting apparatus 41 in synchronization with transmission timing t3' and received by the reception apparatus 60 in synchronization with timing t3. Trigger information 82a includes at least application ID for identifying a data broadcasting application App2, the trigger type indicative of application launch, and an auto start flag indicative of auto start, in addition to trigger ID.

Trigger information 82b, identical to trigger information 82a in contents, is transmitted from the broadcasting apparatus 41 in synchronization with transmission timing t4' and received by the reception apparatus 60 in synchronization with reception timing t4.

Further, in FIG. 8, trigger information 83 is transmitted from the broadcasting apparatus 41 in synchronization with transmission timing t3' and received by the reception apparatus 60 in synchronization with timing t3. Trigger information 83 includes at least application ID for identifying a data broadcasting application App1 and the trigger type indicative of application termination, in addition to trigger ID.

For example, the broadcasting apparatus 41 transmits trigger information 81a stored in a PCR packet in synchronization with transmission timing t1'. In response, the reception apparatus 60 receives trigger information 81a from the broadcasting apparatus 41 in synchronization with reception timing t1. Then, trigger information 81a received by the reception apparatus 60 is entered in the control block 68 via the tuner 61 and the demultiplexer 62.

On the basis of entered trigger information 81a, the control block 68 controls the browser 73 to launch data broadcasting application App1 specified by the application ID included in trigger information 81a.

Also, in synchronization with transmitting timing t2', the broadcasting apparatus 41 transmits trigger information 1b which is stored in a PCR packet, for example. In response, the reception apparatus 60 receives trigger information 81b from the broadcasting apparatus 41 in synchronization with reception timing t2. Then, in the reception apparatus 60, received trigger information 81b is entered in the control block 68 via the tuner 61 and the demultiplexer 62.

If the entered trigger information 81b is for specifying launched data broadcasting application App1, then the control block 68 operates launched data broadcasting application App1 on the basis of trigger information 81a.

Namely, for example, if the reception apparatus 60 receives, with reception timing tn, trigger information (in this example, trigger information 81b) having the same contents as those of the trigger information (in this example, trigger information 81a) received with the last reception timing tn−1, then the processing based on the trigger information received with reception timing tn is not executed.

To be more specific, if, in the reception apparatus 60, data broadcasting application App1 is held in a memory, not shown, incorporated in the browser 73, for example, the control block 68 maintains this holding state. Further, if data broadcasting application App1 is being executed by the browser 73, for example, the control block 68 maintains this execution state.

It should be noted that, if, the reception apparatus 60 receives trigger information 81b with reception timing t2 if trigger information 81a could not be received in synchronization with reception timing t1, then the control block 68 controls the browser 73 on the basis of this trigger information 81b, thereby launching data broadcasting application App1 specified by trigger information 81b.

Further, for example, the broadcasting apparatus 41 transmits trigger information 82a and trigger information 83 stored in the PCR packet in synchronization with transmission timing t3'. In response, in synchronization with reception timing t3, the reception apparatus 60 receives trigger information 82a and trigger information 83 from the broadcasting apparatus 41. Then, trigger information 82a and trigger information 83 received by the reception apparatus 60 are entered in the control block 68 via the tuner 61 and the demultiplexer 62.

On the basis of entered trigger information 83, the control block 68 terminates (or stops) active data broadcasting application App1. In addition, on the basis of entered trigger information 82a, the control block 68 controls the browser 73 to launch data broadcasting application App2 specified by application ID included in trigger information 82a.

Namely, for example, if the reception apparatus 60 receives, with reception timing tn, trigger information (in this example, trigger information 83 or trigger information 82a) having contents different from those of the trigger information (in this example, trigger information 81b) received with the last reception timing tn−1, then the processing based on the trigger information received with reception timing tn is executed.

Further, for example, the broadcasting apparatus 41 transmits trigger information 82b stored in the PCR packet in synchronization with transmission timing t4'. In response, the reception apparatus 60 receives trigger information 82b from the broadcasting apparatus 41 in synchronization with reception timing t4. Next, trigger information 82b received by the reception apparatus 60 is entered in the control block 68 via the tuner 61 and the demultiplexer 62.

If entered trigger information 82b specifies the launched data broadcasting application App2, then the control block 68 directly operates the data broadcasting application App2 specified by trigger information 82b.

It should be noted that, if the reception apparatus 60 receives trigger information 82b with reception timing t4 when the reception apparatus 60 could not receive trigger information 82b in synchronization with reception timing t3, then the control block 68 controls the browser 73 on the basis of this trigger information 82b, thereby launching data broadcasting application App2 specified by trigger information 82b.

Meanwhile, in FIG. 8, while the reception apparatus 60 keeps receiving trigger information (trigger information 81a and trigger information 81b) for specifying data broadcasting application App1 in synchronization with reception timings t1 and t2, data broadcasting application App1 is terminated upon reception of trigger information 83 in synchronization with reception timing t3.

Figure 9:
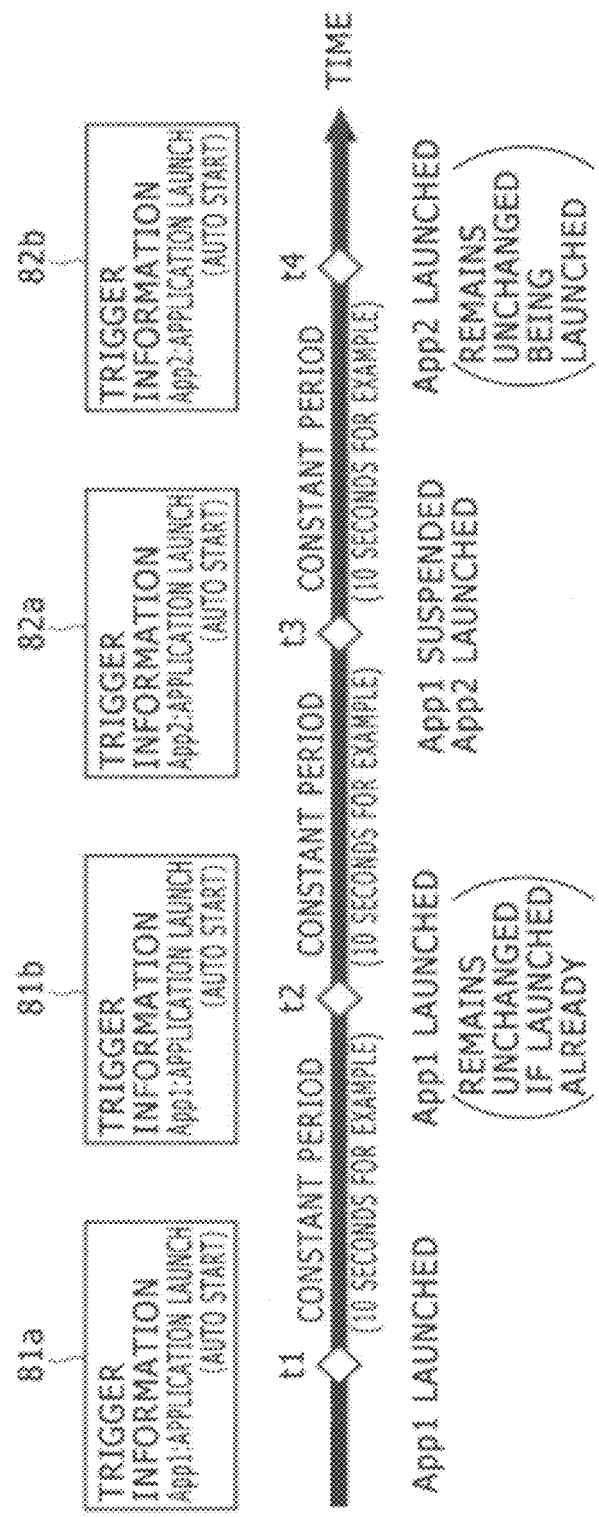
FIG. 9 is a diagram illustrating another example of the trigger information that is transmitted and received in a predetermined period.

In addition, for example, as shown in FIG. 9, while the reception apparatus 60 keeps receiving trigger information (trigger information 81a and trigger information 81b) for specifying data broadcasting application App1 in synchronization with reception timings t1 and t2, data broadcasting application App1 may be terminated when the trigger information for specifying data broadcasting application App1 is not received in synchronization with reception timing t3.

If control is executed as shown in FIG. 9, it is practicable to terminate data broadcasting application App1 with reception timing t3 without waiting for the reception of trigger information 83 in the reception apparatus 60 unlike the case shown in FIG. 8. It should be noted that data broadcasting application App1 may be deleted from the reception apparatus 60 so as to prevent data broadcasting application App1 from being launched again after the termination of data broadcasting application App1.

Further, in the reception apparatus 60, trigger information is received in synchronization with reception timing tn, so that only the PCR packet received in synchronization with reception timing tn may be monitor for trigger information. For this reason, unlike the case where trigger information is transmitted as stored in a PCR packet from time to time, for example, every received packet need not always be monitored for trigger information.

Meanwhile, if trigger information is transmitted from the broadcasting apparatus 41 in synchronization with transmission timing tn', it actually may occur that the trigger information from the broadcasting apparatus 41 cannot be received by the reception apparatus 60 in synchronization with reception timing tn.

In this case, it is regarded that the trigger information was not received by the reception apparatus 60 in synchronization with reception timing tn, so that a failure of obtaining trigger information from the broadcasting apparatus 41 may occur.

Therefore, if the reception apparatus 60 has received trigger information from the broadcasting apparatus 41 during a reception interval determined on the basis of reception timing tn, it is desirable for the reception apparatus 60 to have received trigger information in synchronization with reception timing tn.

It should be noted that, for the reception interval, any one of the following intervals may be employed: an interval from $\Delta t_1$ seconds before reception timing tn to $\Delta t_2$ seconds after reception timing tn, an interval from $\Delta t_1$ seconds before reception timing tn to reception timing tn, and an interval from reception timing tn to $\Delta t_2$ seconds after reception timing tn, for example.

In this case, if trigger information has not been received with receiving timing tn by the reception apparatus 60 but within the reception interval, it is regarded that trigger information has been received with reception timing tn, so that the failure of obtaining trigger information from the broadcasting apparatus 41 can be prevented.

It is also practicable for the broadcasting apparatus 41 to consecutively transmit the same trigger information only two or more times instead of transmitting trigger information once in synchronization with transmission timing tn' so as to make sure for the reception apparatus 60 to receive the trigger information in synchronization with reception timing tn. Consequently, two or more pieces of the same trigger information are transmitted to the reception apparatus 60 in synchronization with transmission timing tn', for example.

The above-mentioned arrangement can enhance the accuracy of the reception of trigger information with reception timing tn by the reception apparatus 60, thereby preventing the occurrence of a failure in trigger information reception.

Now, it may be considered that, instead of transmitting trigger information as stored in a PCR packet, trigger information is periodically transmitted from the broadcasting apparatus 41 as included in AIT (Application Information Table).

Figure 10:
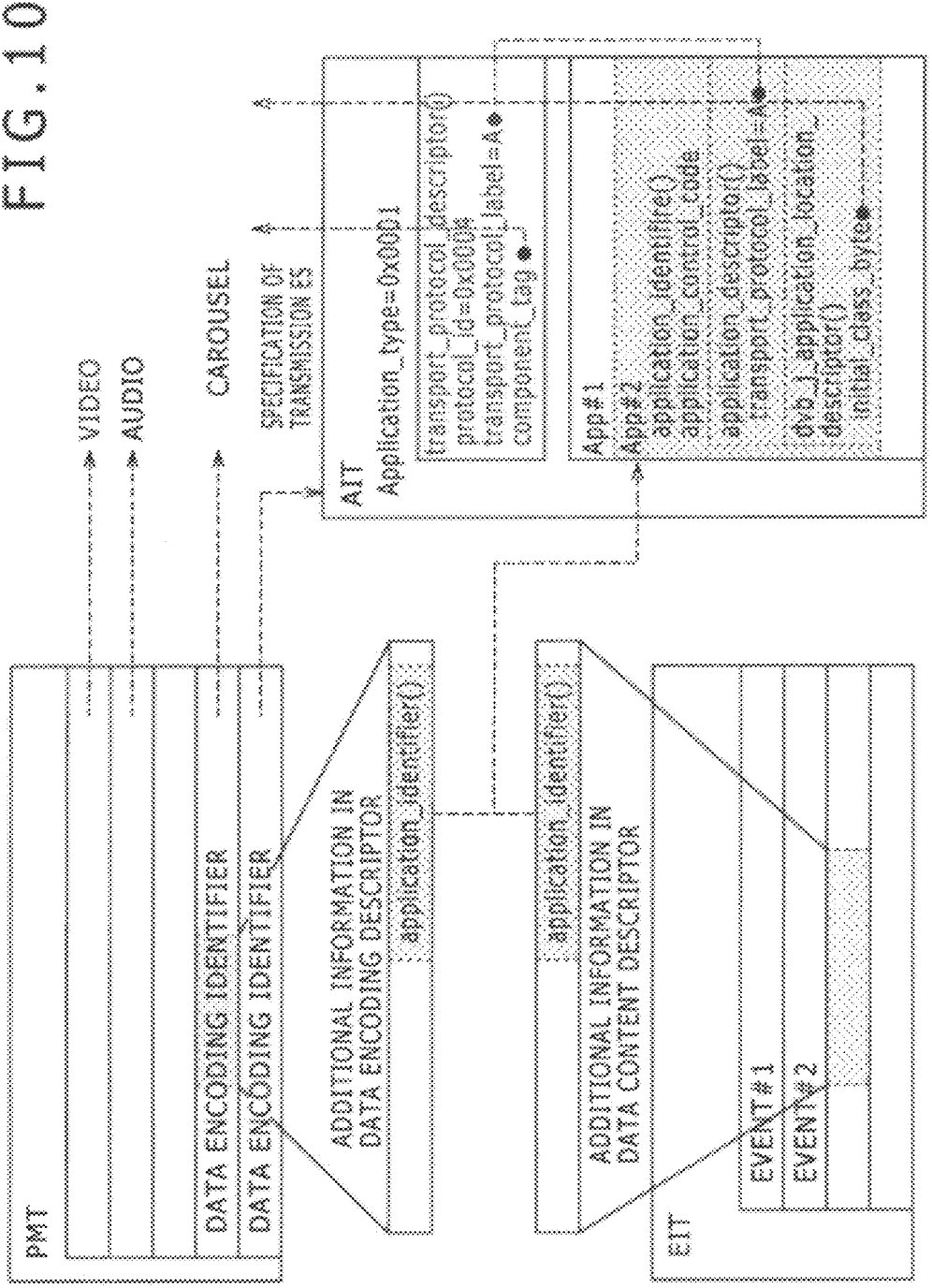
FIG. 10 is a diagram illustrating an example of PMT.

However, in the above-mentioned arrangement, an ES (Elementary Stream) for transmitting an AIT must be additionally provided in a TS. An AIT is configured as arranged in a PMT (Program Map Table) as shown in FIG. 10.

Therefore, if trigger information is transmitted as included in an AIT, for example, the reception apparatus 60 must execute complicated processing of extracting the AIT from a PMT included in a TS and, further, extracting the trigger information from the extracted AIT.

By contrast, in the present embodiment, trigger information is transmitted as included in a PCR packet, so that no ES for transmitting an AIT need be separately arranged in a TS. In the present embodiment, trigger information is transmitted as included in a PCR packet rather than an AIT, so that trigger information may only be extracted from a PCR packet included in a TS in the reception apparatus 60.

[Explanation of Operations]

The following describes trigger information responding processing operations that are executed by the reception apparatus 60.

Figure 11:
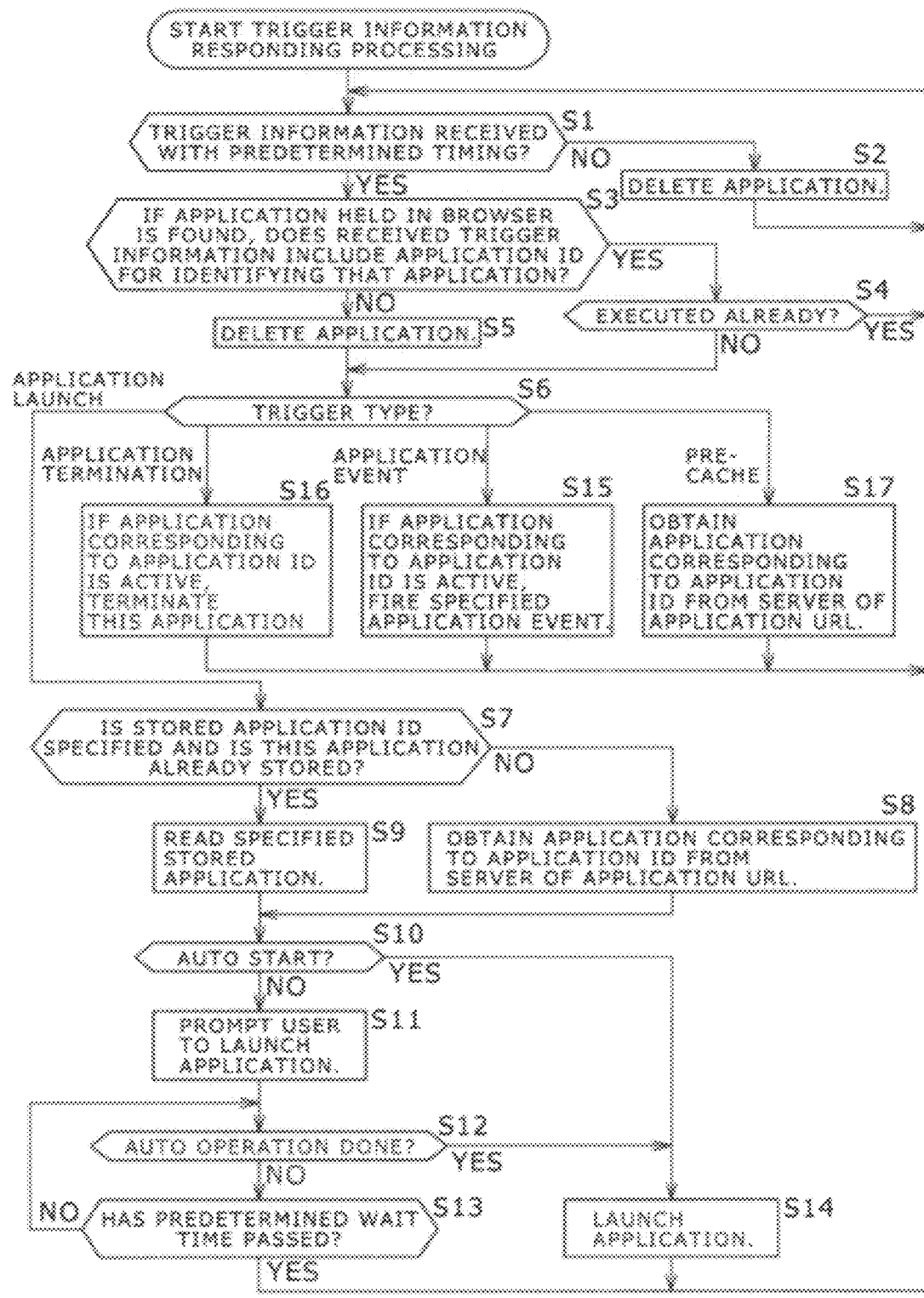
FIG. 11 is a flowchart indicative of trigger information responding processing.

Referring to FIG. 11, there is shown a flowchart indicative of the trigger information handling processing. This trigger information handling processing is repeatedly executed while the user is viewing a television program, namely, while digital television broadcast signals are received.

It should be noted that the trigger information responding processing assumes for the convenience of explanation that one piece of trigger information (for specifying one data broadcasting application) be transmitted with transmission timing tn' from the broadcasting apparatus 41.

In step S1, the control block 68 determines on the basis of an input from the demultiplexer 62 whether a PCR packet including trigger information has been received in synchronization with predetermined reception timing tn. If the PCR packet including trigger information is found to have not been received in synchronization with reception timing tn, then the procedure goes to step S2.

In step S2, if a held data broadcasting application is found in the browser 73 (to be more specific, in a memory, not shown, incorporated in the browser 73), then the control block 68 deletes this data broadcasting application from the memory to return the procedure to step S1 to repeat the above-mentioned processing therefrom.

If a PCR packet including trigger information is received in synchronization with reception timing to in step S1, then the procedure goes to step S3.

In step S3, the control block 68 extracts the trigger information from the received PCR packet. Next, if a held data broadcasting application acquired from the server 42 for example is found in the browser 73, then the control block 68 determines whether the extracted trigger information includes an application ID for identifying the data broadcasting application held in the browser 73.

It should be noted that, if no held data broadcasting application is found in the browser 73 in step S3, step S4 and step S5 are skipped and the procedure goes to step S6.

If the extracted trigger information is found including an application ID for identifying the data broadcasting application held in the browser 73 in step S3, then the procedure goes to step S4.

In step S4, the control block 68 determines on the basis of the extracted trigger information whether the processing operations of step S6 and subsequent steps have already been executed on the basis of this trigger information. Namely, if the trigger information including the same trigger type as the trigger type included in the trigger information received with the last reception timing tn−1 has been received, for example, then the control block 68 determines that the processing operations of step S6 and subsequent steps has already been executed.

If the trigger information including a trigger type different from the trigger type included in the trigger information received with the last reception timing tn−1 has been received, then the control block 68 determines that the processing operations of step S6 and subsequent steps have not been executed.

If the processing operations of step S6 and subsequent steps are found already executed, the state (the active state or the pre-cache state, for example) of the data broadcasting application held in the browser 73 is maintained and the procedure is returned to step S1 to repeat the above-mentioned processing therefrom. By contrast, if the processing operations of step S6 and subsequent steps are found not executed on this trigger information, the procedure goes to step S6.

On the other hand, if the extracted trigger information is found not to include the application ID for identifying the data broadcasting application held in the browser 73 in step S3, then the procedure goes to step S5.

In step S5, the control block 68 deletes the data broadcasting application held in the browser 73.

Namely, if the data broadcasting application is pre-cached (held) in the browser 73 by the processing of step S17 to be described later, for example, the control block 68 deletes the data broadcasting application pre-cached in the browser 73.

If the data broadcasting application held in the browser 73 is active, for example, the control block 68 terminates this data broadcasting application and deletes this data broadcasting application from the browser 73. It should be noted that, if the data broadcasting application held in the browser 73 is active, then the control block 68 may terminate this data broadcasting application and may not delete this data broadcasting application from the browser 73.

Subsequently, the procedure goes from step S5 to step S6. In step S6, the control block 68 determines whether the trigger type of this trigger information is application launch, application event, application termination, or pre-cache.

If the trigger type is found to be application launch in step S6, then the procedure goes to step S7. In step S7, the control block 68 determines whether the stored application ID is specified in this trigger information and the data broadcasting application corresponding to this stored application ID has already been stored in the recording block 71. If the determination is NO, the procedure goes to step S8. In step S8, the control block 68 controls the browser 73 to make the browser 73 access the server 42 corresponding to the application URL in the trigger information, obtain the data broadcasting application corresponding to (or specified by) the application ID in the trigger information, and hold the acquired data broadcasting application in the memory incorporated in the browser 73. If the corresponding data broadcasting application has already been acquired by the browser 73 from the server 42 corresponding to the above-mentioned URL in step S17 to be described later and pre-cached (held in the memory incorporated in the browser 73), then the procedure goes to step S10 by skipping the processing of step S8.

By contrast, if the stored application ID is found specified in this trigger information and the corresponding data broadcasting application has already been stored in the recording block 71 in step S7, then the procedure goes to step S9. In step S9, the control block 68 controls the browser 73 to make the browser 73 read the data broadcasting application corresponding to the stored application ID in the trigger information and hold in the memory of the browser 73. Subsequently, the procedure goes to step S10.

In step S10, the control block 68 determines whether the auto start flag in the trigger information is auto start or not.

If the auto start flag in the trigger information is found not to be auto start (namely, found to be manual start) in step S10, then the procedure goes to step S11. In step S11, under the control of the control block 68, the browser 73 displays a message "Do you want to execute (the name of an application)?" for example on the screen, thereby prompting the user to execute an operation for launching a data broadcasting application. If a launching operation is found entered by the user in response to this prompt in step S12, the procedure goes to step S14. In step S14, under the control of the control block 68, the browser 73 launches the data broadcasting application held in step S8, step S9, or step S17. Subsequently, the procedure is returned to step S1 to repeat the above-mentioned processing therefrom.

It should be noted that, if, after the prompt display in step S11, the launching operation by the user is not found executed in step S12 and a predetermined period of time is found passing in this step S13 without any launching operation by the user, then the procedure is returned to step S1 to repeat the above-mentioned processing therefrom.

It should also be noted that, if the auto start flag in the trigger information is found to be auto start in step S10, then the procedure goes to step S14. In step S14, under the control of the control block 68, the browser 73 launches the data broadcasting application held in step S8, step S9, or step S17. Subsequently, the procedure is returned to step S1 to repeat the above-mentioned processing therefrom.

If the trigger type in this trigger information is found to be application event in step S6, then the procedure goes to step S15. In step S15, only when there is a match between the application ID of this trigger information and the application ID of the active data broadcasting application, the control block 68 controls the browser 73 to fire (or execute) an event corresponding to the event ID of the trigger information. Subsequently, the procedure is returned to step S1 to repeat the above-mentioned processing therefrom.

If the trigger type in this trigger information is found to be application termination in step S6, then the procedure goes to step S16. In step S16, only when there is a match between the application ID of this trigger information and the application ID of the active data broadcasting application, the control block 68 controls the browser 73 to terminate the active data broadcasting application. It should be noted that the terminated active data broadcasting application may be deleted from the browser 73. Subsequently, the procedure is returned to step S1 to repeat the above-mentioned processing therefrom.

If the trigger type in this trigger information is found to be pre-cache in step S6, then the procedure goes to step S17. In step S17, the control block 68 controls the browser 73 to access the server 42 corresponding to the application URL in the trigger information to obtain the data broadcasting application corresponding to the application ID in the trigger information, thereby storing the acquired data broadcasting application in the storage block, such as a memory, incorporated in the browser 73. Subsequently, the procedure is returned to step S1 to repeat the above-mentioned processing therefrom.

If the trigger type is set to pre-cache as in step S17, the corresponding data broadcasting application can be acquired prior to the broadcasting time of a television program to be linked with the data broadcasting application. Consequently, the corresponding data broadcasting application can be executed upon start of a television program to be linked with the data broadcasting application. In addition, this arrangement is expected to provide effects of distributing the concentration of accesses to the server 42. Thus, the trigger information responding processing has been explained.

As described above, according to the trigger information responding processing, if the extracted trigger information is found, in step S3, not including the application ID for identifying the data broadcasting application pre-cached in the browser 73, then the control block 68 deletes the data broadcasting application held in the browser 73 in step S5.

Consequently, according to this trigger information responding processing, the data broadcasting application held in the browser 73 can be deleted without waiting for the reception of the trigger information for specifying the deletion of the data broadcasting application held in the browser 73.

[Example of Screen Displays Provided by the Execution of Data Broadcasting Application]

Figure 12:
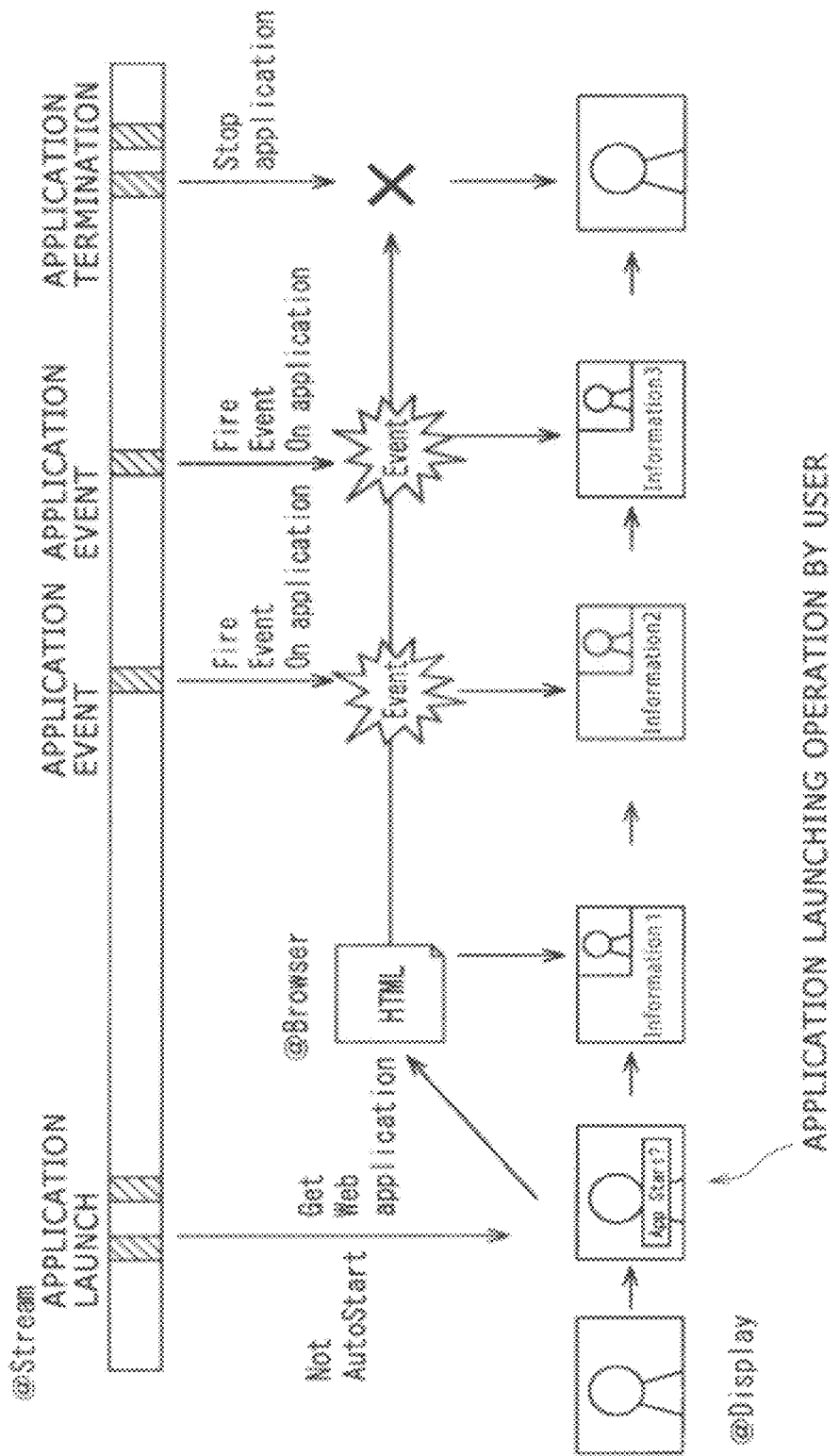
FIG. 12 is a diagram illustrating screen display examples that are shown when a data broadcasting application is executed.

Referring to FIG. 12, there are shown screen transitions that occur when a data broadcasting application is executed in conjugation with the progress of a television program with the auto start flag in trigger information being off (namely, manual start).

When trigger information with the trigger type being application launch and the auto start flag being off (manual start) is received while the user is viewing a television program, a corresponding data broadcasting application is acquired. Next, display for prompting the user to execute an operation for launching the data broadcasting application is displayed as superimposed on the video of the television program. When the user enters a lunching operation in response to this prompt, the data broadcasting application is launched, upon which the screen display becomes a composition of the video corresponding to the data broadcasting application and the video of the television program.

When the trigger information with the trigger type being application event is received with the data broadcasting application being active, an event corresponding to the event ID in the trigger information is fired in the active data broadcasting application. Consequently, of the screen displays, an area corresponding to the data broadcasting application is changed to the video corresponding to the event ID in the trigger information.

Subsequently, if the trigger information with the trigger type being application termination is received or the trigger information for specifying the active data broadcasting application is not received any more, the active data broadcasting application is terminated, upon which the video of the television program is displayed all over the screen.

As described above, according to the broadcasting system 30 practiced as one embodiment of the invention, the trigger information associated with data broadcasting is transmitted as embedded in a PCR packet or a video signal and a data broadcasting application is supplied from a server through the Internet. This novel configuration allows the realization of services for providing the content for data broadcasting linkable with television programs without especially arranging a band for data broadcasting in the broadcasting band of digital television broadcasting.

In addition, in the retransmission of a digital television program via a CATV network or a satellite communication network, services for providing the content for data broadcasting linkable with television programs are also realized.

In the embodiments described above, the trigger information is information for controlling the processing associated with one data broadcasting application (the trigger information 81a and so on shown in FIG. 8 for example). However, the trigger information is not restricted to this function.

For example, trigger information 101 for controlling the processing associated with two or more data broadcasting application App1, App2, and App3 and trigger information 102 for controlling the processing associated with two or more data broadcasting applications App1 and App2 may be used as shown in FIG. 13.

The above-mentioned sequence of processing operations may be executed by software as well as hardware. When the above-mentioned sequence of processing operations is executed by software, the programs constituting the software are installed in a computer which is built in dedicated hardware equipment or installed, from a program recording media, into a general-purpose personal computer for example in which various programs may be installed for the execution of various functions.

[Exemplary Configuration of the Computer]

Referring to FIG. 14, there is shown a block diagram of an exemplary hardware configuration of a computer by which the above-mentioned sequence of processing operations are executed.

In this computer 100, a CPU (Central Processing Unit) 101, a ROM (Read Only Memory) 102, and a RAM (Random Access Memory) 103 are interconnected by a bus 104.

The bus 104 is connected to an input/output interface 105. The input/output interface 105 is connected to an input block 106 made up of a keyboard, a mouse, a microphone, and so on, an output block 107 made up of a display monitor, a loudspeaker, and so on, a storage block 108 based on a hard disk unit or a nonvolatile memory, a communication block 109 based on a network interface and so on, and a drive 110 configured to drive a removable media 111 such as a magnetic disk, an optical disk, a magneto-optical disk, or a semiconductor memory.

In the computer configured as described above, the CPU 101 loads a program stored in the storage block 108 into the RAM 103 via the input/output interface 105 and the bus 104 to run the loaded program, thereby executing the above-mentioned sequence of processing operations.

It should be noted that the program to be run by the computer may execute the processing operations in a time dependent manner in the sequence described herein, in parallel, or as on an on-demand basis.

It should also be noted that each program may be run by one unit of computer or by two or more units of computers in a distributed manner. Further, each program may be transferred to a remote computer and run thereon.

It should also be noted that term "system" as used herein denotes an entire apparatus configured by a plurality of component units.

While preferred embodiments of the present invention have been described using specific terms, such description is for illustrative purpose, and it is to be understood that changes and variations may be made without departing from the spirit or scope of the following claims.

What is claimed is:

1. A reception apparatus for receiving audio/video (AV) content, comprising:
   reception means for receiving first control information listing an application to be executed in interlocked relation with a progress of said AV content and receiving, after receiving the first control information, second control information listing at least one application to be executed in interlocked relation with a progress of the AV content;
   control means for
   determining whether said application listed by said received first control information is listed in the second control information;
   in response to a determination that said application listed by the first control information is not listed in the second control information, terminating said application listed in the first control information
   in response to a determination that said application listed by the first control information is listed in the second control information, performing processing associated with said application listed by the first control information.

2. A reception method for a reception apparatus for receiving audio/video (A/V) content, comprising:
   receiving, by circuitry of said reception apparatus, first control information listing an application to be executed in interlocked relation with a progress of said AY content and receiving, after receiving the first control information, second control information listing at least one application to be executed in interlocked relation with a progress of the AV content: and
   determining, by said circuitry, whether said application listed by said received first control information is listed in the second control information;
   in response to a determination that said application listed by the first control information is not listed in the second control information, terminating said application listed in the first control information; and
   in response to a determination that said application listed by the first control information is listed in the second control information, performing processing associated with said application listed in the first control information.

3. A non-transitory computer-readable storage medium storing a program for controlling a reception apparatus for receiving audio/video (A/V) content, said program causing a computer of said reception apparatus to execute processing comprising;
   receiving first control information listing an application to be executed in interlocked relation with a progress of said AV content and receiving, after receiving the first control information, second control information listing at least one application to be executed in interlocked relation with a progress of the AV content; and
   determining whether said application listed by said received first control information is listed in the second control information
   in response to a determination that said application listed by the first control information is not listed in the second control information, terminating said application listed in the first control information
   in response to a determination that said application listed by the first control information is listed in the second control information, performing processing associated with said application listed in the first control information.

4. A transmission apparatus for transmitting audio/video (AV) content, comprising:
   transmission means for transmitting to a reception apparatus said first control information listing an application to be executed on said reception apparatus in interlocked relation with a progress of said AV content and transmitting to the reception apparatus, after transmitting the first control information, second control information Listing at least one application to be executed in interlocked relation with a progress of the AV content
   wherein said reception apparatus
   determines whether said application listed by said first control information is listed in the second control information
   in response to a determination that said application listed by the first control information is not listed in the second control information, terminates said application listed in the first control information;
   in response to a determination that said application listed by the first control information is listed in the second control information, performs processing associated with said application listed in the first control information.

5. A transmission method for a transmission apparatus for transmitting audio/video (AV) content, comprising:
   transmitting to a reception apparatus, by circuitry of said transmission apparatus, first control information listing an application to be executed on said reception apparatus in interlocked relation with a progress of said AV content and transmitting to the reception apparatus, after transmitting the first control information, second control information listing at least one application to be executed in interlocked relation with a progress of the AV content,
   wherein reception apparatus determines whether said application listed by said first control information is listed in the second control information
   in response to a determination that said application listed by the first control information is not listed in die second control information, terminates said application listed in the first control information and
   in response to a determination that said application listed by the first control information is listed in the second control information, performs processing associated with said application listed in the first control information.

6. A non-transitory computer-readable storage medium storing a program for controlling a transmission apparatus for transmitting audio/video (AV) content, said program causing a computer of said transmission apparatus to execute processing comprising: transmitting to a reception apparatus first control information listing an application to be executed on said reception apparatus in interlocked relation with a progress of said AV content and transmitting to the reception apparatus, after transmitting the first control information, second control information listing at least one application to be executed in interlocked relation with a progress of the AV content,
   wherein said apparatus determines whether said application listed by said first control information is listed in the second control information;
   in response to a determination that said application listed by the first control information is not listed in the second control information, terminates said application listed in the first control information; and
   in response to a determination that said application listed by the first control information is listed in the second control information, performs processing associated with said application listed in the first control information.

7. A broadcasting system comprising: a transmission apparatus for transmitting AV content, and
   a reception apparatus for receiving said transmitted AV content;
   wherein said transmission apparatus includes
   a transmitter configured to transmit first control information listing an application to be executed on said reception apparatus in interlocked relation with a progress of said AV content and to transmit after transmitting the first control information, second control information listing at least one application to be executed in interlocked relation with a progress of the AV content; and
   said reception apparatus includes
   a receiver configured to receive said first control information listing said application to be executed is interlocked relation with said progress of said AV content and to receive, after receiving the first control information, the second control information listing the at least one application to be executed in interlocked relation with a progress of the AV content;
   circuitry configured to
   determine whether said application listed by said received first control information is listed in the second control information;
   in response to a determination that said application listed by the first control information is not listed in the second control information, terminate said application listed in the first control information; and
   in response to a determination that said application listed by the first control information is listed in the second control information, perform processing associated with said application listed by the first control information.

8. A reception apparatus for receiving audio/video (AV) content, comprising;
   a memory configured to store an application; and circuitry configured to
   receive first control information listing the application to be executed in interlocked relation with a progress of said AV content and receive, after receiving the first control information, second control information listing at least one application to be executed in interlocked relation with a progress of the AV content; and
   determine whether said application listed by said received first control information is listed in the second control information;
   in response to a determination that said application listed by the first control information is not listed in the second control information, terminate said application listed in the first control information; and
   in response to a determination that said application listed by the first control information is listed in the second control information, perform processing associated with said application listed by the first control information.

9. The reception apparatus according to claim 8, wherein said circuitry is configured to delete said application listed by the first control information from said memory in response to a determination that the application listed by the first control information is not listed in the second control information.

10. The reception apparatus according to claim 8, wherein,
when said received second control information is different from previously received first control information, said circuitry is configured to control an operation in which the application listed by the first control information is launched, an event in the application listed by the first control information is fired, or the application listed by the first control information is terminated.

11. The reception apparatus according to claim 8, wherein, when said application listed by the first control information is not stored in said memory, said circuitry is configured to download said application listed by the first control information in response to said received first control information.

12. A transmission apparatus for transmitting AV content, comprising:
circuitry configured to transmit to a reception apparatus first control information listing an application is to be executed on said reception apparatus in interlocked relation with a progress of said AV content and transmitting to the reception apparatus, after transmitting the first control information, second control information listing at least one application to be executed in interlocked relation with a progress of the AV content,
wherein reception apparatus
determines whether said application listed by said first control information is listed in the second control information
in response to a determination that said application listed by the first control information is not listed in die second control information, terminates said application listed in the first control information; and
in response to a determination that said application listed by the first control information is listed in the second control information, performs processing associated with said application listed in the first control information.

13. The reception apparatus according to claim 8, wherein in performing the processing associated with the application listed in the first control information, said circuitry is configured to perform application acquisition, application launch, application termination, or application firing.

14. The reception apparatus according to claim 8, wherein said first control information includes a URL of a server that stores said application.

15. The transmission apparatus according to claim 12, wherein said transmitter is configured to transmit the first and the second control information for controlling processing associated with said application listed in the first control information.

16. The transmission apparatus according to claim 12, wherein, in performing the processing associated with the application listed in the first control information, said reception apparatus is configured to perform application acquisition, application launch, application termination, and application firing.

17. The transmission apparatus according to claim 12, wherein said first control information includes a URL of a server that stores said application.

* * * * *